United States Patent
Awano et al.

(10) Patent No.: US 6,818,107 B2
(45) Date of Patent: Nov. 16, 2004

(54) CHEMICAL REACTOR

(75) Inventors: Masanobu Awano, Aichi (JP); Yoshinobu Fujishiro, Aichi (JP); Hae Jin Hwang, Aichi (JP); Sergei Bredikhin, Aichi (JP); Kazuyuki Matsuda, Aichi (JP); Kunihiro Maeda, Aichi (JP); Takao Kanai, Aichi (JP); Motoyuki Miyata, Aichi (JP)

(73) Assignees: National Institute of Advanced Industrial Science and Technology, Tokyo (JP); Fine Ceramics Research Association, Tokyo (JP)

( * ) Notice: Subject to any disclaimer, the term of this patent is extended or adjusted under 35 U.S.C. 154(b) by 43 days.

(21) Appl. No.: 10/101,176

(22) Filed: Mar. 20, 2002

(65) Prior Publication Data
US 2003/0019762 A1 Jan. 30, 2003

(30) Foreign Application Priority Data
Jul. 25, 2001 (JP) ........................................ 2001-225034

(51) Int. Cl.$^7$ ............................. C25B 11/03; C25B 1/00
(52) U.S. Cl. ........................ 204/252; 204/284; 205/617
(58) Field of Search ......................... 205/617; 204/252, 204/290.01, 284

(56) References Cited

U.S. PATENT DOCUMENTS 4,950,380 A * 8/1990 Kurosawa et al. .......... 204/406
5,705,136 A * 1/1998 Drago et al. ............. 423/239.1

OTHER PUBLICATIONS

S. Pancharatnam, et al., J. Electrochem. Soc.: Electronchemical Science and Technology, vol. 122, No. 7, pps. 869–875, "Catalytic Decomposition of Nitric Oxide on Zirconia by Electrolytic Removal Of Oxygen", Jul. 1975.

T. Hibino, et al., J. Chem. Soc. Faraday Trans., vol. 91, No. 13, pps. 1955–1959, "Medium–Temperature Electrolysis of NO and $CH_4$ Under Lean–Burn Conditions Using YTrria–Stabilized Zirconia as a Solid Electrolyte", 1995.

* cited by examiner

*Primary Examiner*—Roy King
*Assistant Examiner*—Harry D Wilkins, III
(74) *Attorney, Agent, or Firm*—Oblon, Spivak, McClelland, Maier & Neustadt, P.C.

(57) ABSTRACT

The invention relates to a chemical reactor having an electrochemical cell containing a three-layer structure for the decomposition and removal of a substance treated by a chemical reaction.

8 Claims, 1 Drawing Sheet

CHEMICAL REACTOR

BACKGROUND OF THE INVENTION

1. Field of the Invention

The present invention relates to a chemical reactor in which a nitrogen oxide or other substance to be treated is subjected to a chemical reaction, and more particularly relates to a chemical reactor with which, for example, nitrogen oxides can be efficiently decomposed and removed from a combustion exhaust gas containing oxygen, and to a method for removing nitrogen oxides by using this chemical reactor.

2. Description of the Related Art

The use of a three-way catalyst is the most common method today for removing nitrogen oxides generated by a gasoline engine. Still, there is a problem in that the adsorption of oxygen that is also present in the gas sharply diminishes the surface activity of the catalyst in diesel engines or under lean burn conditions that afford better fuel economy, and this has led to the use of a removal method featuring intermittent reduction conditions using an oxygen occluding catalyst.

The oxygen molecules in an exhaust gas are also sometimes removed to outside the system without poisoning the surface of the catalyst by using a solid electrolyte membrane having oxygen ion conductivity, and sending electrical current to this membrane. One system that has been proposed as a chemical reactor involves applying voltage to a solid electrolyte sandwiched between electrodes and thereby decomposing the surface-adsorbed oxygen and nitrogen oxides into oxygen and nitrogen, and removing the oxygen from the reaction surface by so-called bumping.

A look at prior publications reveals that *J. Electrochemical Soc.*, 122, 869 (1975) discloses that nitrogen oxides can be decomposed into nitrogen and oxygen by forming a platinum electrode on both sides of zirconia that has been stabilized with scandium oxide and then applying voltage. Also, *J. Chem. Soc. Faraday Trans.*, 91, 1995 (1995) discloses that nitrogen oxides can be decomposed into nitrogen and oxygen in a mixed gas of nitrogen oxides, hydrocarbons, and oxygen by forming a palladium electrode on both sides of zirconia that has been stabilized with yttria and then applying voltage.

A problem with these systems, though, is that a considerable amount of external current must be supplied in order to effect oxygen bumping. Specifically, when oxygen molecules are more likely than nitrogen oxide molecules to be adsorbed to oxygen defects and so forth in the crystal lattice in a reaction, current must be supplied at the outset for removing these occluded oxygen molecules to outside the system, which greatly diminishes the reaction efficiency, something that poses a major obstacle to the practical use of such a system.

To solve the above problem, the amount of oxygen bumping required in a catalyst reaction must be suppressed and higher efficiency achieved in nitrogen oxide adsorption and decomposition reactions in order to minimize the amount of electrical power needed for oxygen bumping.

To this end, there is a method in which the selective adsorptivity to nitrogen oxide molecules is raised at the surface of the catalyst material being used, but so far no material has been obtained that exhibits higher selectivity to nitrogen oxide molecules than to oxygen molecules, and higher reaction efficiency is needed as part of the overall performance achieved by structural control.

In light of the above situation with prior art, the inventors conducted diligent research aimed at developing a novel technique with which the amount of electrical power required by oxygen bumping could be kept to a minimum, and higher efficiency could be attained in nitrogen oxide adsorption and decomposition reactions. As a result, they arrived at the present invention upon discovering that the stated object can be achieved by sufficiently lowering the number of oxygen molecules before they reach the adsorption/removal reaction site, which is accomplished by reducing nitrogen oxides into oxygen ions at the electron conductor in the cathode of the chemical reactor, conducting these ions through an ion conductor, and performing bumping on the anode side.

SUMMARY OF THE INVENTION

The present invention provides a chemical reactor that is effective in environmental purification. This is chemical reactor for decomposing and removing a substance to be treated by means of a chemical reaction, comprising an electrochemical cell consisting of a three-layer structure of a cathode, a solid electrolyte, and an anode, in which the internal structure of the cathode is such that nanometer-sized through holes are surrounded by the solid portion, the ion conductor and the electron conductor are distributed in a network form in which they are in close contact with each other, and have a size ranging from the nanometer level to sub-micron. Such a chemical reactor allows for more efficient electrochemical reactions. Also provided is a method for removing nitrogen oxides by using this chemical reactor.

It is an object of the present invention to provide a chemical reactor in which a substance to be treated such as nitrogen oxides is subjected to a chemical reaction.

It is a further object of the present invention to provide a chemical reactor with which nitrogen oxides can be efficiently decomposed and removed from a combustion exhaust gas containing oxygen, and a method for removing nitrogen oxides by using this chemical reactor.

The present invention for achieving the stated objects comprises the following technological means.

(1) A chemical reactor for decomposing and removing a substance to be treated by means of a chemical reaction, comprising an electrochemical cell consisting of a three-layer structure of a cathode, a solid electrolyte, and an anode, wherein the cathode consists of an electrical conductor having nano-sized continuous pores that pass through three-dimensionally.

(2) The chemical reactor according to (1) above, wherein the cathode comprises a material composed of an electroconductive oxide, a metal, a composite of either of these two, or a composite of both of these.

(3) The chemical reactor according to (1) above, wherein the cathode contains as an ion conductor an inorganic solid having oxygen ion conductivity, and contains as an electron conductor an electroconductive metal and/or oxide.

(4) The chemical reactor according to (1) above, wherein the solid electrolyte is an oxygen ion conductor.

(5) The chemical reactor according to (1) above, wherein the pores in the cathode have a diameter of 100 nm or less and are continuously distributed from the surface all the way down to the lower part of the cathode.

(6) The chemical reactor according to (5) above, wherein the pores in the cathode account for at least 10 vol % of the cathode.

(7) The chemical reactor according to (1) above, wherein the continuous pores in the cathode are produced by heat treating the electrical conductor or the electron conductor/ion conductor.

(8) The chemical reactor according to (1) above, wherein the cathode is divided into upper and lower parts, and the lower part of the cathode is both electroconductive and ion conductive.

(9) The chemical reactor according to (3) above, wherein the volumetric ratio of the ion conductor and the electron conductor at the lower part of the cathode is between 3:7 and 7:3.

(10) A method for decomposing and removing a substance to be treated using the chemical reactor according to any of (1) to (9) above, which comprises subjecting a nitrogen oxide to the reactor, applying a current to an electrochemical cell thereof, reducing the nitrogen oxide into oxygen ions by an electron conductor in a cathode, conducting these ions through an ion conductor to lower the relative amount of oxygen gas molecules at the reaction site with respect to the nitrogen oxide gas molecules, and then decomposing the nitrogen oxide.

DESCRIPTION OF THE PREFERRED EMBODIMENTS

Figure 1:
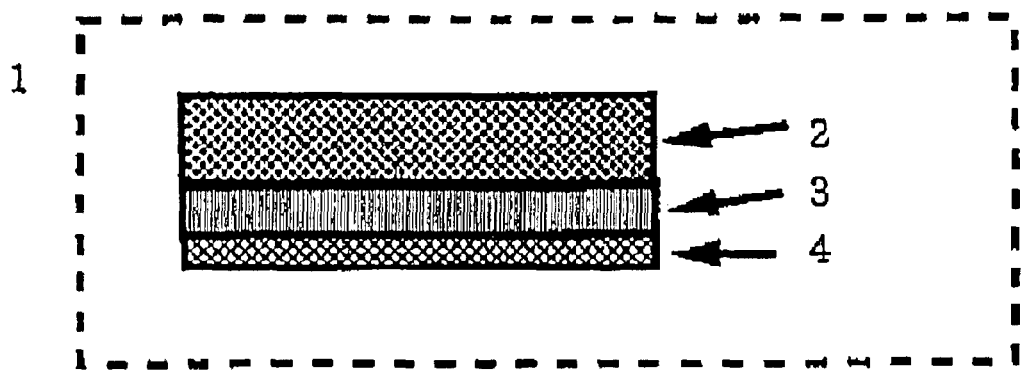
FIG. 1 is a cross section schematically illustrating the chemical reactor pertaining to an embodiment of the present invention.

The present invention will now be described in further detail.

The present invention is a chemical reactor in which a nitrogen oxide or other treatment substance is subjected to a chemical reaction. For instance, it is a chemical reactor comprising an electrochemical cell having a characteristic structure that affords higher reaction efficiency at the catalyst-electrode layer portion where the reaction takes place in the course of a chemical reaction for treating a substance that is a source of environmental pollution (in this case nitrogen oxides).

The inventors found that when the surface properties are such that the selective adsorptivity to nitrogen oxide molecules does not exceed that to oxygen molecules, the adsorption of oxygen molecules is promoted in the region of low participation in the catalyst reaction, and as a result, either oxygen molecules are already absent at the catalyst reaction site, or even if they are present, their concentration is low, so the selective adsorptivity with respect to nitrogen oxide molecules is greatly increased, and also found that if the current path over which the electrical power required for oxygen bumping is supplied, and the ion conduction path over which ionized oxygen is removed from the reaction site, are suitably configured, the efficiency of the current needed for removing the above-mentioned nitrogen oxides will be increased to a surprising degree, several times higher than the best figures reported up to now.

Specifically, the amount of current needed for oxygen bumping depends on how efficient the bumping is of oxygen molecules selectively adsorbed to the surface. Accordingly, in the case of an automobile engine exhaust gas (and particularly the exhaust gas from a diesel engine or that produced under the lean burn conditions used to improve fuel economy), in which the number of oxygen gas molecules is large with respect to the gas undergoing the removal reaction (such as nitrogen oxides), a large amount of current is necessary for this system to operate.

Possible ways to reduce the application of current include (1) raising the selectivity of nitrogen oxide gas molecules with respect to oxygen gas molecules, and (2) lowering the apparent required amount of current by reducing the relative amount of oxygen gas molecules at the reaction site with respect to nitrogen oxide gas molecules.

The above method (1) relies on the surface properties of the material, but so far no material has been obtained that exhibits this mechanism to a satisfactory extent. The present invention solves this problem by developing a microstructure with which the conditions in the above method (2) are possible. Specifically, it involves actually taking advantage of the low selective adsorptivity of nitrogen oxides with respect to oxygen molecules, and the conditions of the above method (2) are effectively achieved by making it possible to sufficiently reduce the number of oxygen gas molecules before they reach the adsorption/removal reaction site.

The chemical reactor of the present invention comprises an electrochemical cell consisting of a three-layer structure of a cathode, a solid electrolyte, and an anode. The above-mentioned cathode has the following structure.

1) It consists of an electrical conductor having nano-sized continuous pores that pass through three-dimensionally.

2) It comprises a material composed of an electroconductive oxide, a metal, a composite of either of these two, or a composite of both of these.

3) It contains as an ion conductor an inorganic solid having oxygen ion conductivity, and contains as an electron conductor an electroconductive metal and/or oxide.

4) Preferably, the ion conductor and the electron conductor are distributed in a network form in which they are in close contact with each other, and have a size ranging from the nanometer level to sub-micron.

Specifically, as shown by the structural diagram in FIG. 1, with a chemical reactor having a three-layer structure of a cathode, a solid electrolyte, and an anode, if nano-sized pores that pass through three-dimensionally are distributed throughout the entire cathode, the selective adsorption of oxygen molecules to the nano-pore walls will be promoted highly efficiently in the upper part of these layers, and by the time the gas reaches the lower part of the layers, where the nitrogen oxide adsorption/decomposition reaction primarily occurs, the number of nitrogen oxide molecules in the gas will exceed that of the oxygen molecules. As a result, even though there is no change in the proportional adsorption and decomposition of the oxygen/nitrogen oxides, and the oxygen molecules undergo these reactions preferentially, there will be a pronounced increase in the efficiency at which the nitrogen oxides are adsorbed and decomposed.

If we consider the pore diameter and length versus the size of the gas molecules, in order to obtain the above effect it is preferable if the pore diameter is no more than 100 nm at most, with 30 nm or less being even better, and if the volumetric ratio of the pore portion to the solid portion is at least 10 vol %.

For example, when a cell is produced having a mixed oxide/metal cathode in which the total thickness of the cathode layers is 7 $\mu$m, if the pore diameter is 10 to 20 nm, the current efficiency with respect to nitrogen oxides in the presence of 2% oxygen reaches 2.4% or higher, whereas at 30 nm this efficiency is only about 1.7%, and drops to under 1% at 50 nm. There has been almost no experimental evidence of the relation of pores 100 nm or larger to current efficiency through an adsorption effect in the pores. Similarly, when the pore volume is less than 10 vol %, the decomposition efficiency itself does not reach 50% due to a decrease in reaction surface area.

Also, in order for an electrochemical reaction to proceed at high efficiency at the cathode, it is preferable for the walls of the conductive layer forming the nano-pores to have at the same time a structure for conducting an electrochemical reaction at high efficiency.

Specifically, it is preferable if the electron conductor, whose role is the transport of electrons of adsorbed oxygen molecules from the lower part of the cathode, to be distributed as finely as possible in the form of a three-dimensional network.

From the standpoints of conductivity characteristics and chemical stability, it is preferable for the above-mentioned electron conductor to be selected from among nickel oxide, copper oxide, and other such electroconductive oxides, nickel, platinum, and other such metals, and mixtures of these.

It is even better for there to be a similar three-dimensional network structure in close contact with the above-mentioned electron conductor, and for an ion conductor to be uniformly and finely distributed. The result of this is that electrons are received from the electron conductor, and the produced oxygen ions are easily bumped from the cathode through the solid electrolyte to the anode side according to the potential difference of the electrochemical cell.

Favorable examples of the above-mentioned ion conductor include iron oxides and other perovskite oxides, yttria-stabilized zirconia, scandium-stabilized zirconia, samarium- or cadmium-added ceria, and lanthanum-strontium-calcium-manganese exhibiting high conductivity to oxygen ions.

In addition to the electron conductor and ion conductor both being finely distributed in the form of a three-dimensional network and in a sub-micron size, and preferably down to the order of nanometers, it is also possible to use a mixed conductor such as lanthanum-strontium-manganese that combines electron and ion conductivity.

It is also possible to reduce the current needed for the entire cathode by providing the lowermost part of the cathode with an electrode layer that is distributed so as not to impede the conduction of oxygen ions from the ion conductor, and that supplies electrons to the electron conductor. In this case, platinum, nickel, and so forth are favorable as the electrode layer because they provide the requisite chemical stability and high conductivity.

Heat treatment of the electron conductor/ion conductor at 1000 to 1600° C., and control of this heat treatment temperature, are effective ways of forming this micro-structure. For instance, a favorable micro-structure is formed in the above-mentioned nickel oxide-zirconia mixed oxide by performing the heat treatment at 1400° C. or 1450° C., while a similar micro-structure can be created at 1300° C. in the above-mentioned lanthanum-strontium-calcium-manganese or iron oxide.

The role of the lower part of the catalyst-electrode layer in the electrochemical cell structure is to facilitate the supply of the current needed for the oxygen bumping reaction, and to provide a path of high ion conductivity over which the oxygen thus produced can be bumped. To this end, it is preferable to perform the current supply effectively and to optimize the weight ratio and composition of the electron conductor and ion conductor located near the path of high ion conductivity.

The preferred ratio of ion conductor to electron conductor falls within a range of 3:7 to 7:3 because of the mixed state of two different phases, but since the optimal ratio is closely correlated to the state in which the two phases are present together, it should be determined according to this state. For example, in the case of a composite composition of two difference phases on the order of several tens to several hundred nanometers, at which effective oxygen bumping is possible, the optimal ratio is 6 parts ion conductor to 4 parts electron conductor.

The present invention is characterized by comprising an electrochemical cell consisting of a three-layer structure of a cathode, a solid electrolyte, and an anode, wherein the cathode consists of an electrical conductor having nano-sized continuous pores that pass through three-dimensionally; and is further characterized in that the cathode is composed of an electroconductive oxide, a metal, a composite of either of these two, or a composite of both of these, and that the cathode contains an ion conductor (an inorganic solid material having oxygen ion conductivity) and an electron conductor (an electroconductive metal and/or oxide). The nitrogen oxide is reduced into oxygen ions at the electron conductor in the cathode, these ions are conducted through the ion conductor and bumped to the anode side, which lowers the relative amount of oxygen gas molecules at the reaction site with respect to the nitrogen oxide gas molecules. This keeps down the apparent required amount of current, markedly increases the current efficiency needed for removing the above-mentioned nitrogen oxide, and allows the nitrogen oxide to be decomposed and removed. In particular, if either the electron conductor, whose role it is to transport electrons of adsorbed oxygen molecules from the lower part of the cathode, or the ion conductor, which exhibits high conductivity to oxygen ions, or both of these conductors is or are made as fine as possible in the form of a three-dimensional network and finely dispersed in a sub-micron size, and preferably down to the order of nanometers, it will be possible to conduct an electrochemical reaction at the cathode at a high level of efficiency.

The present invention will now be described in specific terms through examples, but the present invention is not limited in any way by these examples.

EXAMPLE 1

A mixture of zirconia and platinum was applied by screen printing to one side of a solid electrolyte consisting of sintered zirconia containing 8 mol % yttria, with the mixture applied to the solid electrolyte such that the thickness after firing would be approximately 20 microns. A mixed layer of nickel oxide and zirconia, which constituted the upper part of the catalyst-electrode layer, was also applied by screen printing over the mixed layer of the ion conductor and electron conductor formed above. The nickel oxide and zirconia were ground and mixed in a ratio of 4:6 here. This product was fired at 1450° C., after which a platinum electrode was baked onto the opposite side. This electrochemical cell was installed in a tubular electric furnace maintained at a temperature of 600 to 800° C., a sample gas (NOx concentration: 1000 ppm, oxygen content: 2%, base gas: argon) was blown in at a rate of 50 mL/minute, and the relationship between the amount of nitrogen oxide decomposition and the electrical power sent to the cell was examined. It was found that even at 600° C., at which efficiency was low because of the high resistance of the solid electrolyte, the amount of power that had to be sent to the cell in order to decompose 50% of the nitrogen oxide was 0.4 watt (cell reaction surface area: 1 $cm^2$; the same applies hereinafter).

EXAMPLE 2

Zirconia containing 1 mol % yttria and 10 mol % scandium oxide was used as a solid electrolyte, and zirconia and platinum were mixed by the same method as in Example 1. The zirconia and platinum were pre-ground here, both to make them finer and to perform a mechano-chemical activation treatment at the same time, and this allowed a conductive path to be ensured with a smaller amount of platinum.

Unlike the mixed oxide layer used in Example 1, the upper part of the catalyst-electrode layer in this example was lanthanum-strontium-cobalt-iron oxide (LSCF), which is a mixed conductor. This improved the oxygen ion transport characteristics and the supply of electrons necessary for a high-efficiency electrochemical reaction. A finely ground sample was made into a paste and an upper layer was formed by screen printing. This was baked at 1300° C., then the opposite side was coated with platinum and fired. Current was applied to perform a removal reaction, and as a result the nitrogen oxide decomposition efficiency reached 50% at an applied voltage of 2.9 volts (electric power of 0.5 W) (cell operating temperature: 600° C.).

EXAMPLE 3

Sintered ceria containing 10 mol % ultrafine particles of samarium was used as a solid electrolyte, one side of which was coated with a paste in which finely ground zirconia and platinum had been mixed. Metallic nickel and ceria were mixed in an inert gas to prepare a paste, which was applied over the above. This coating was done such that the film thickness after firing would be approximately 30 microns. After firing, a tungsten electrode was vapor deposited on the opposite side. A sample gas (NOx concentration: 1000 ppm, oxygen content: 2%, base gas: argon) was blown into this electrochemical cell at a rate of 50 mL/minute, and the relationship between the amount of nitrogen oxide decomposition and the electrical power sent to the cell was examined. It was found that at a cell operating temperature of 600° C., the amount of power that had to be sent to the cell in order to decompose 50% of the nitrogen oxide was 0.38 watt.

EXAMPLE 4

Sintered ceria containing 20 mol % gadolinium was used as a solid electrolyte, one side of which was coated with a paste produced by pyrolyzing a coprecipitated powder synthesized from a zirconium oxychloride solution and a platinum chloride solution, making the extremely uniform and fine particles thus obtained into a slurry, and adding an organic solvent. This coating was baked onto the solid electrolyte surface at 600° C. Using a metal alkoxide solution as a starting substance, a film of a lanthanum-strontium-manganese oxide precursor was produced by spin coating, and a solid cathode layer was formed by heating to 1350° C. A platinum electrode film was formed on the opposite side, and the resulting electrochemical cell was evaluated for its nitrogen oxide removal performance using a dual chamber. A sample gas (NOx concentration: 1000 ppm, oxygen content: 3%, base gas: argon) was blown into this electrochemical cell at a rate of 50 mL/minute and a cell operating temperature of 600° C., and the relationship between the amount of nitrogen oxide decomposition and the electrical power sent to the cell was examined. It was found that the amount of power that had to be sent to the cell in order to decompose 50% of the nitrogen oxide was 0.32 watt.

EXAMPLE 5

A nickel oxide-zirconia layer and an anode were formed by the same process as in Example 1, using a paste in which zirconia and platinum had been uniformly mixed in a 6:4 ratio for the zirconia-platinum layer formed over the solid electrolyte. Firing was performed at the same 1450° C., and the sample thus produced was tested at 600° C. by the same method to examine nitrogen oxide decomposition performance at an oxygen content of 2%, as well as the amount of current that had to be supplied to the cell during its operation. It was found that the required current was only 0.25 watt, or about half that in Example 1.

As described in detail above, the present invention relates to a chemical reactor for decomposing and removing a substance to be treated by means of a chemical reaction, comprising an electrochemical cell consisting of a three-layer structure of a cathode, a solid electrolyte, and an anode, wherein the cathode consists of an electrical conductor having nano-sized continuous pores that pass through three-dimensionally. The present invention provides the following effects.

(1) A novel chemical reactor is provided with which environmental purification operations such as the decomposition of nitrogen oxides through an electrochemical reaction can be carried out at high efficiency, even under conditions in which oxygen is present.

(2) Because the substance to be treated can be treated very efficiently, less electrical current is required in the treatment of the substance, which lowers the power consumption of the chemical reactor.

(3) With the present invention, gas molecule adsorption sites can be continuously activated even in the presence of oxygen, so this chemical reactor can be combined with other catalyst substances and used as a reactor for removing various types of environmental pollution, such as hydrogen sulfide.

(4) A reactor with which oxygen can be efficiently separated from a mixed gas is provided, as is a high-efficiency oxidation reactor for gases, liquids, and solids that takes advantage of the fact that the produced oxygen is active.

What is claimed is:

1. A chemical reactor for decomposing and removing a substance to be treated by means of a chemical reaction, comprising an electrochemical cell consisting of a three-layer structure of a cathode, a solid electrolyte, and an anode, wherein the cathode is constituted by an electrical conductor having nano-sized continuous pores that pass through three-dimensionally, and wherein the cathode contains as an ion conductor an inorganic solid having oxygen ion conductivity, and contains as an electron conductor an electroconductive metal and/or oxide.

2. The chemical reactor according to claim 1, wherein the cathode comprises a material composed of an electroconductive oxide, a metal, a composite of either of these two, or a composite of both of these.

3. The chemical reactor according to claim 1, wherein the solid electrolyte is an oxygen ion conductor.

4. The chemical reactor according to claim 1, wherein the cathode is divided into upper and lower parts and the pores in the cathode have a diameter of 100 nm or less and are continuously distributed from the surface all the way down to the lower part of the cathode.

5. The chemical reactor according to claim 4, wherein the pores in the cathode account for at least 10 vol % of the cathode.

6. The chemical reactor according to claim 1, wherein the continuous pores in the cathode are produced by heat treating the electrical conductor or the electron conductor/ion conductor.

7. The chemical reactor according to claim 1, wherein the cathode is divided into upper and lower parts, and the lower part of the cathode comprises an electroconductive electrode having a composite structure with both electroconductive and ion conductive characteristics.

8. The chemical reactor according to claim 1, wherein the cathode is divided into upper and lower parts and the volumetric ratio of the ion conductor and the electron conductor at the lower part of the cathode is between 3:7 and 7:3.

* * * * *